Aug. 6, 1935.  R. WARREN  2,010,653
RECORD CONTROLLED STATISTICAL MACHINE
Filed July 12, 1933  13 Sheets-Sheet 1

INVENTOR
Richard Warren
BY
ATTORNEY

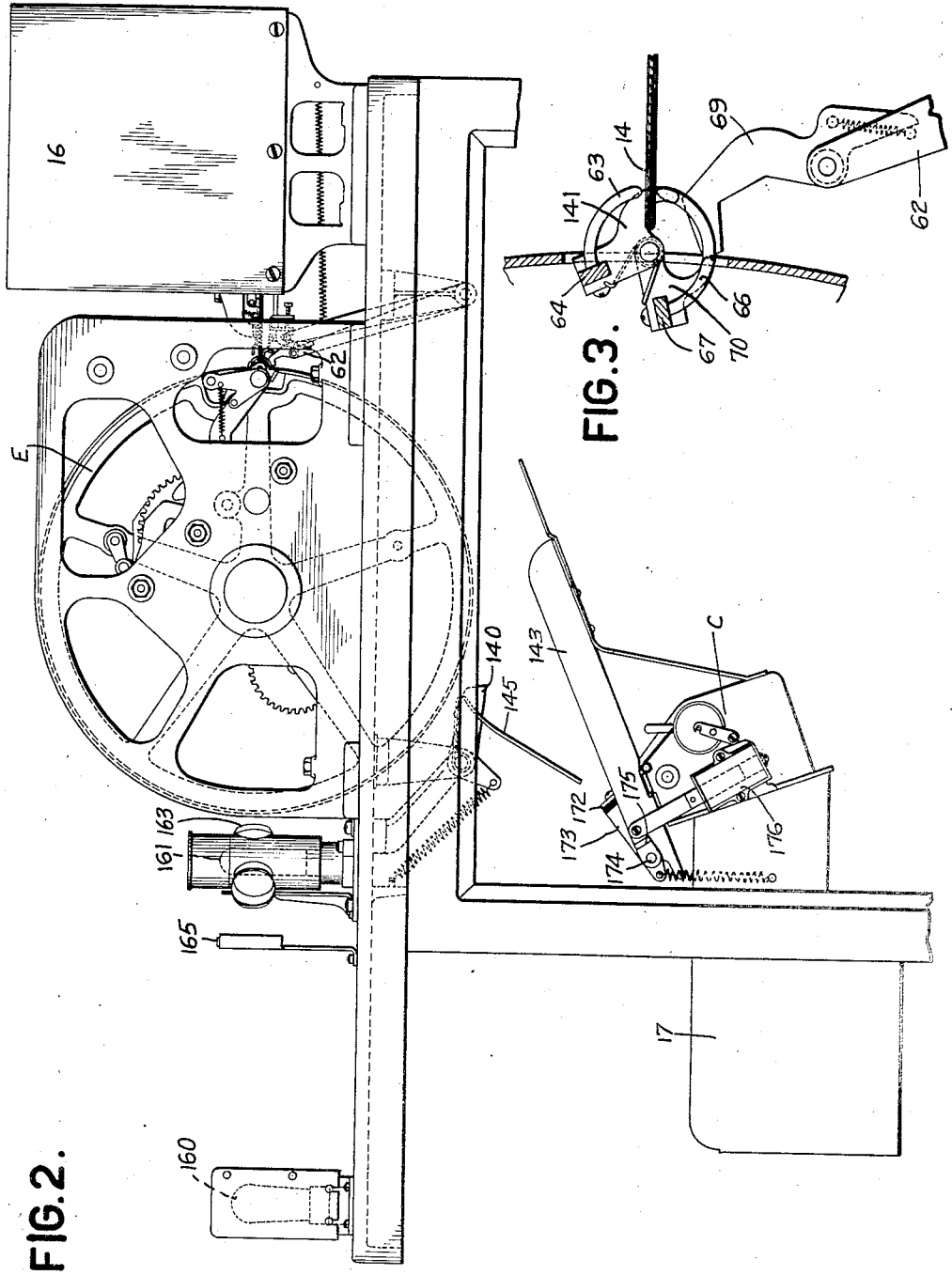

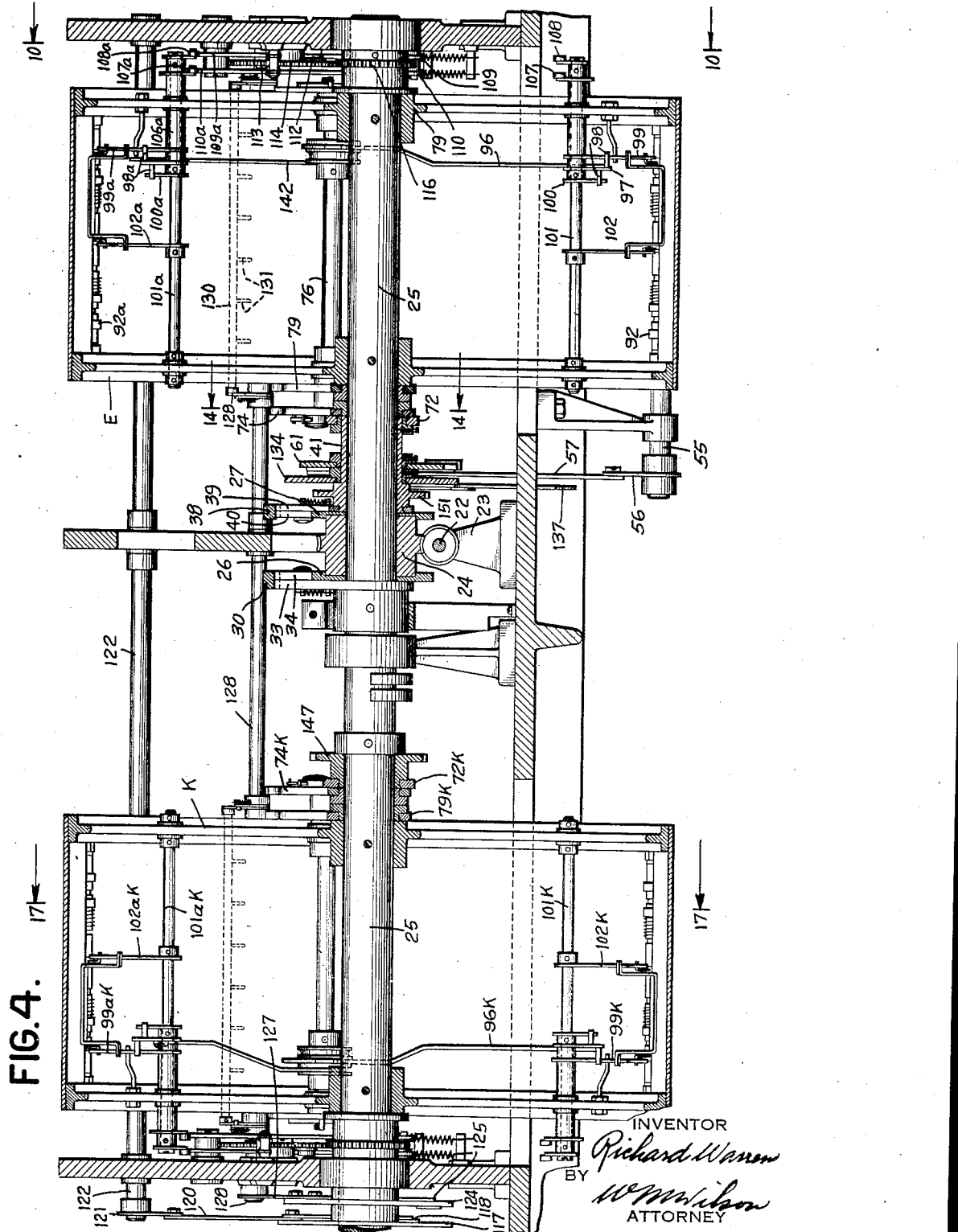

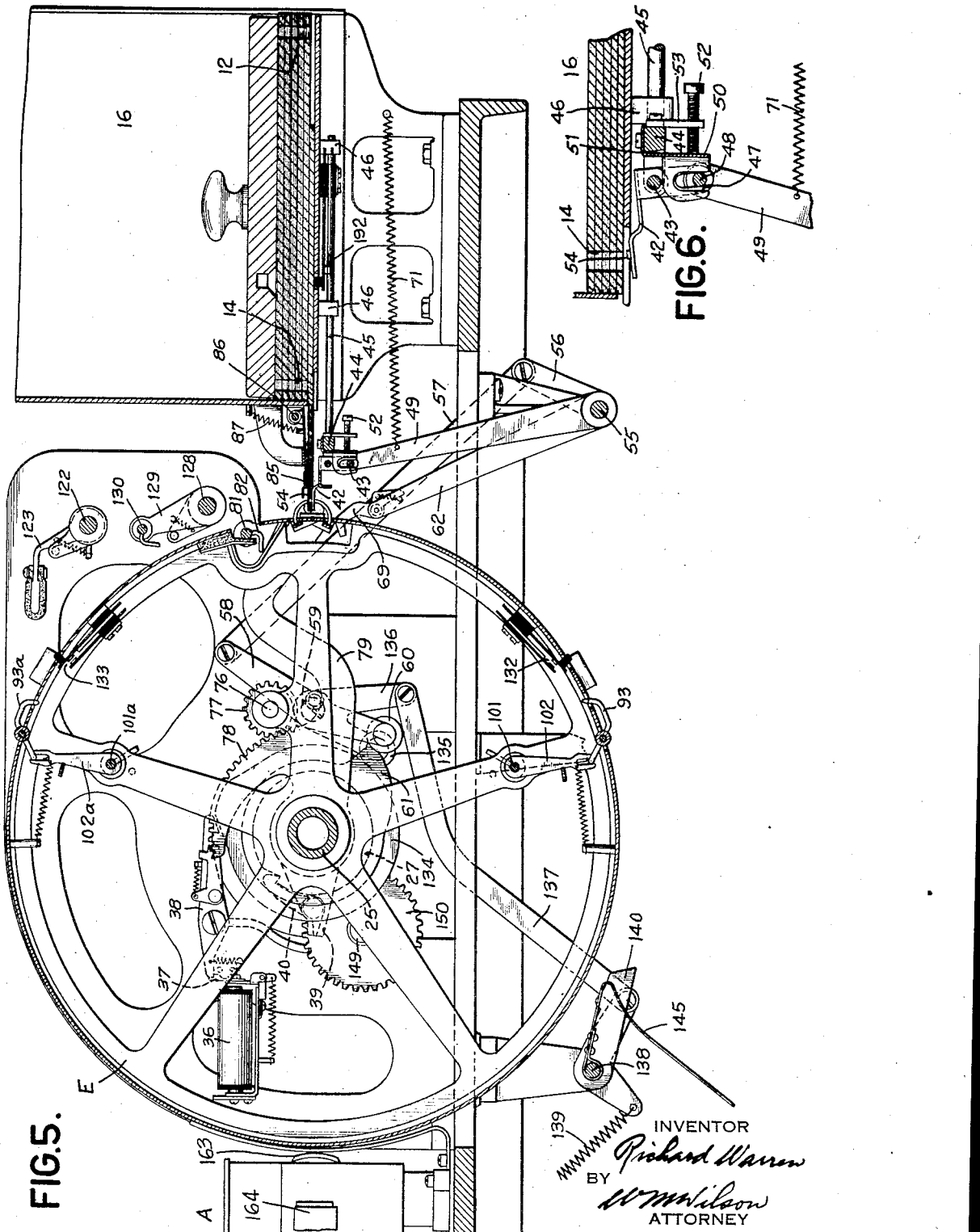

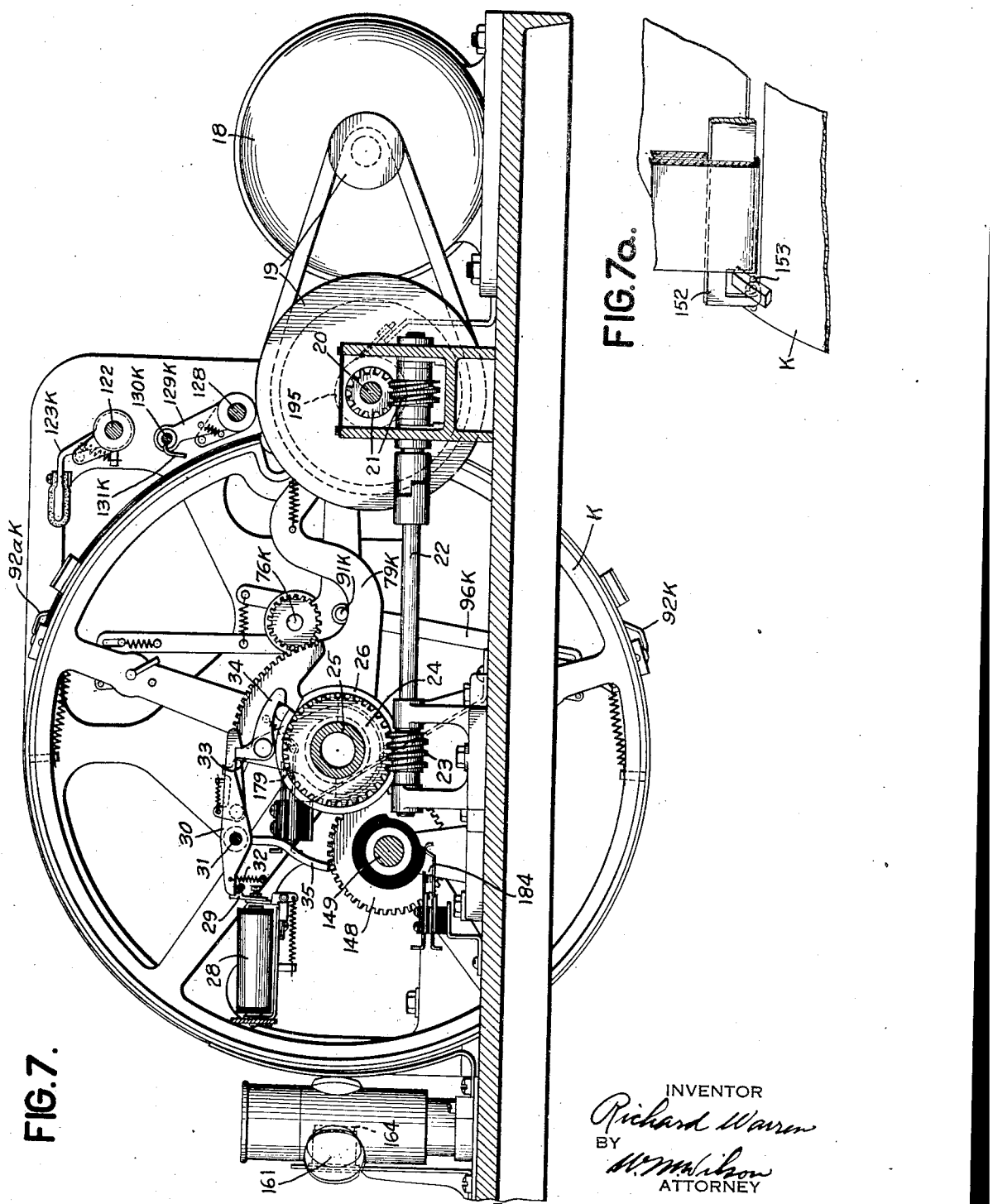

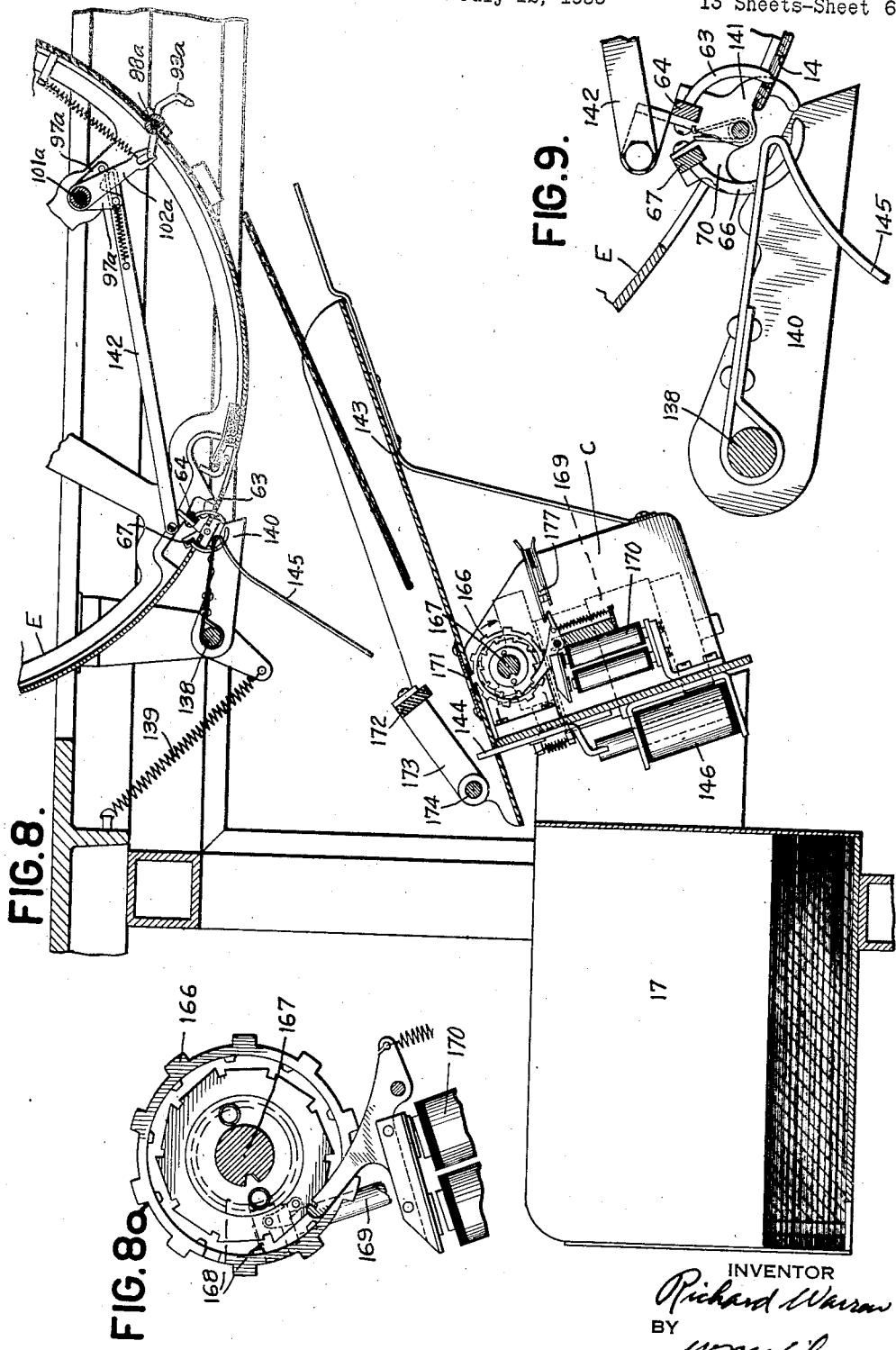

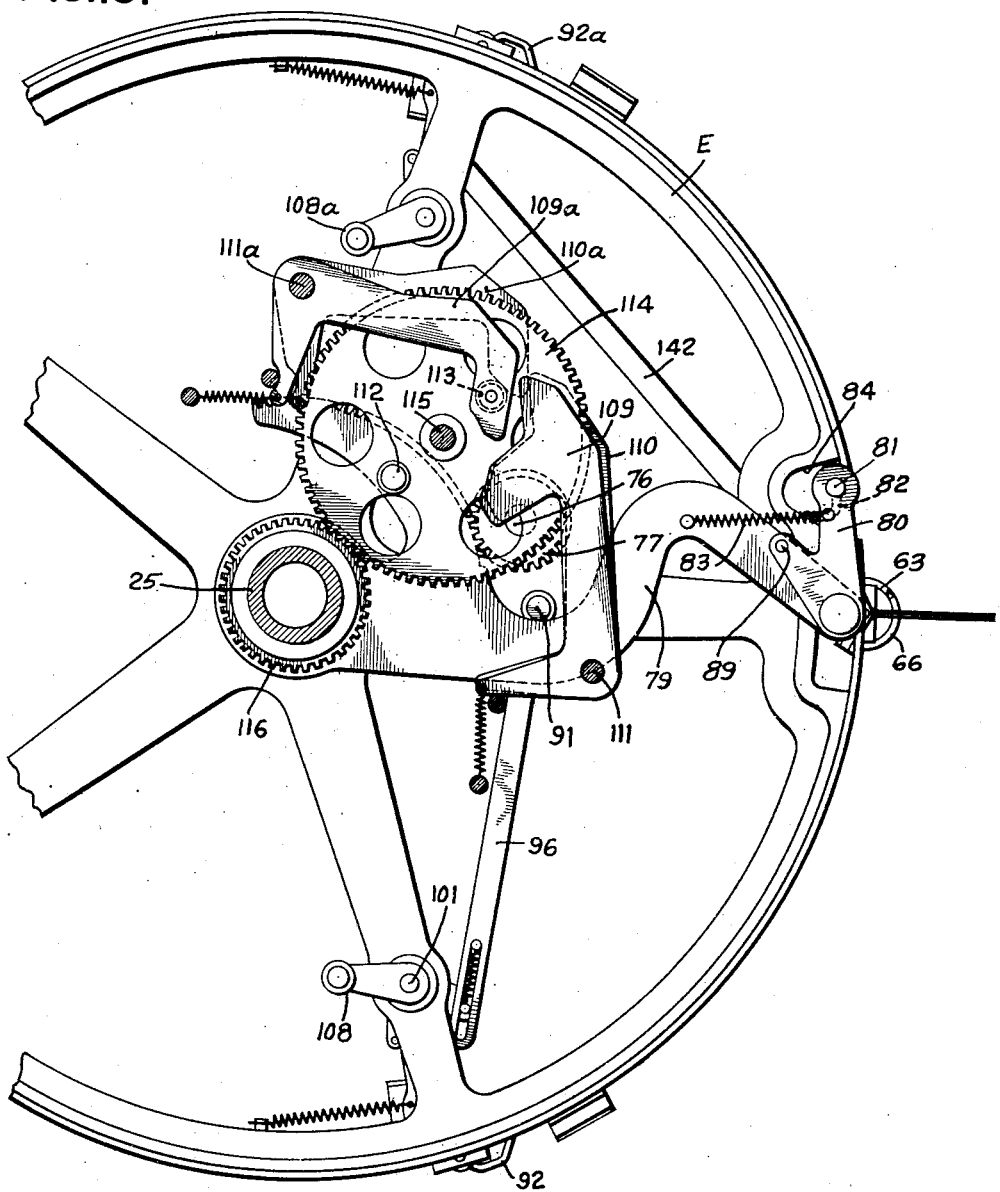

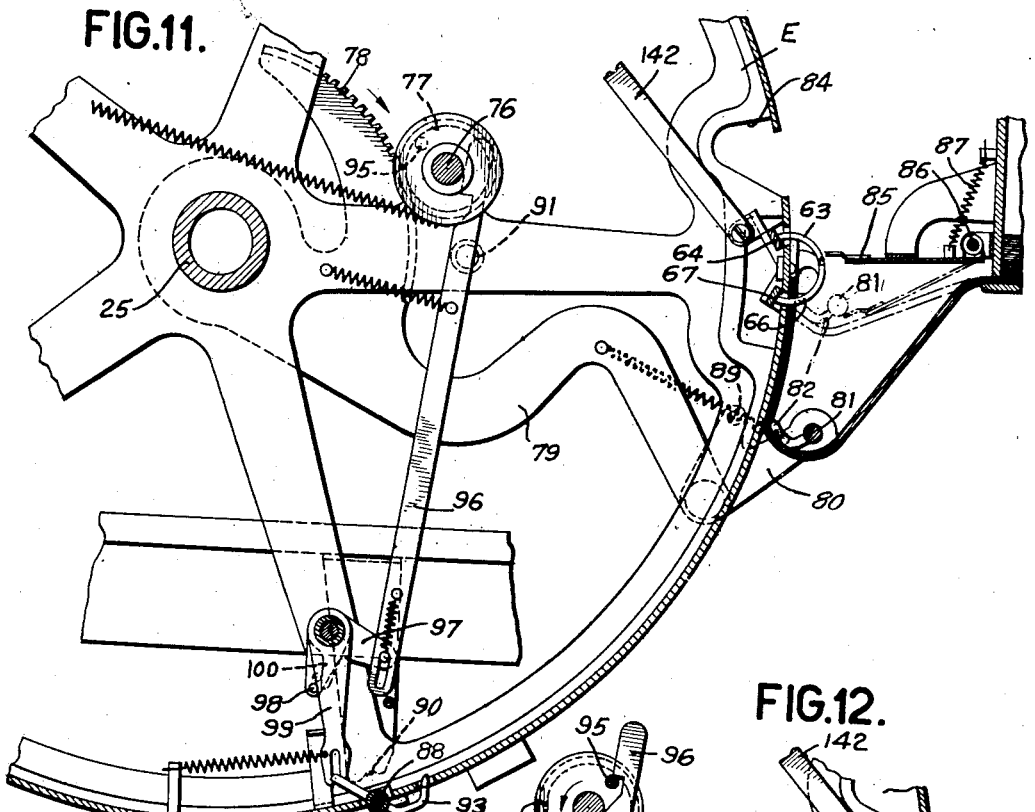
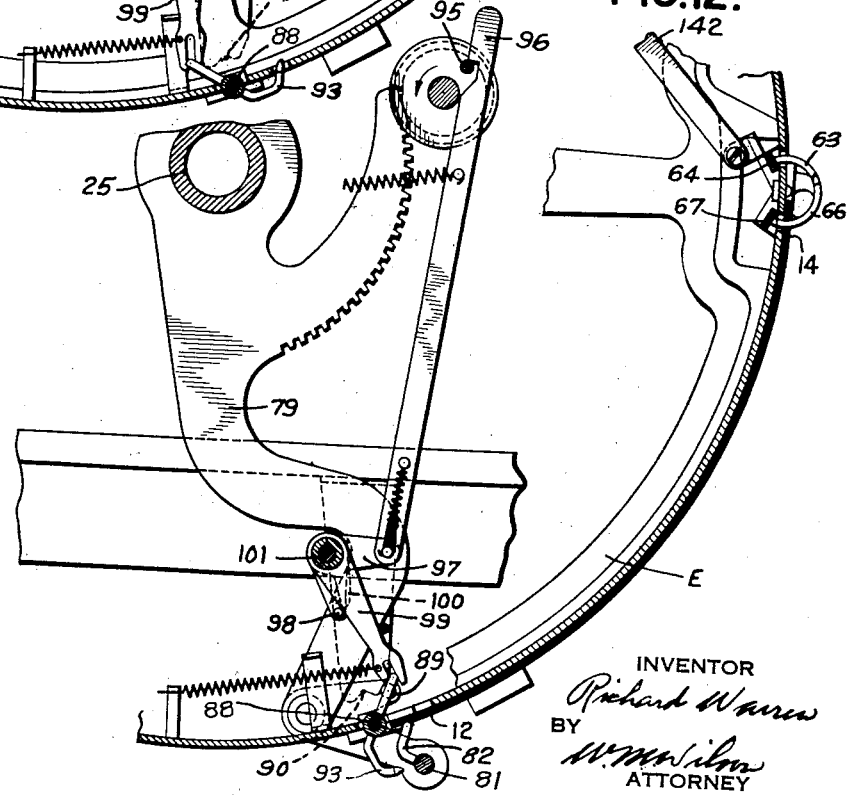

Aug. 6, 1935.  R. WARREN  2,010,653
RECORD CONTROLLED STATISTICAL MACHINE
Filed July 12, 1933  13 Sheets-Sheet 9
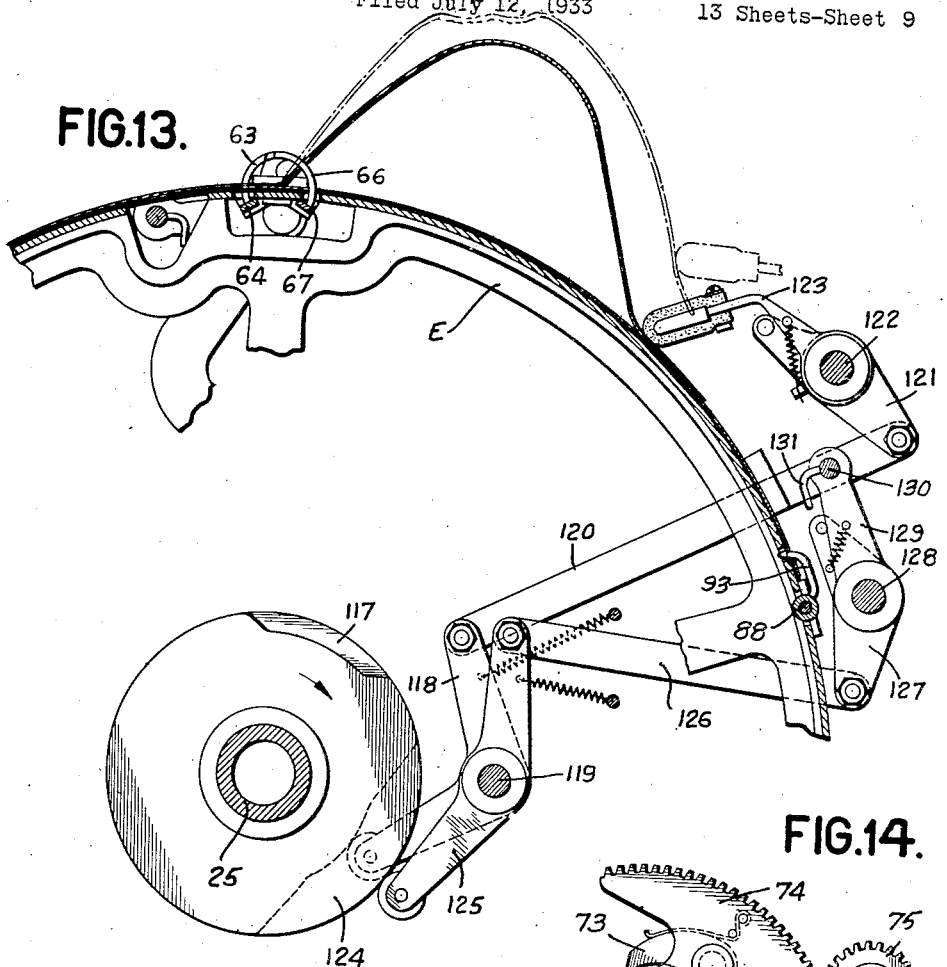
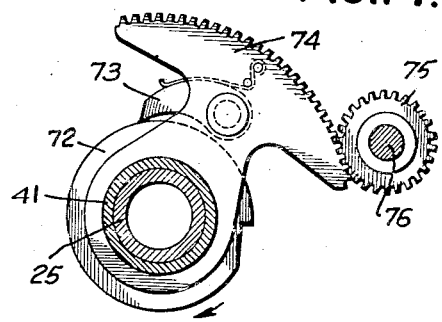
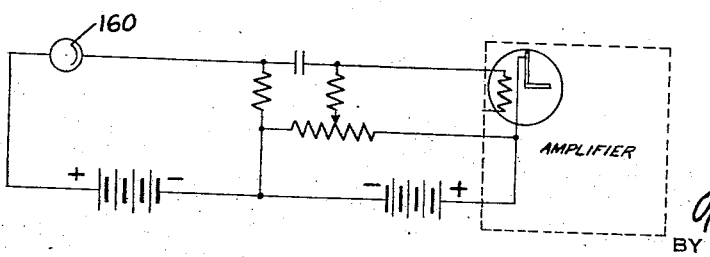
INVENTOR
Richard Warren
BY
ATTORNEY Aug. 6, 1935.　　　R. WARREN　　　2,010,653
RECORD CONTROLLED STATISTICAL MACHINE
Filed July 12, 1933　　　13 Sheets-Sheet 10
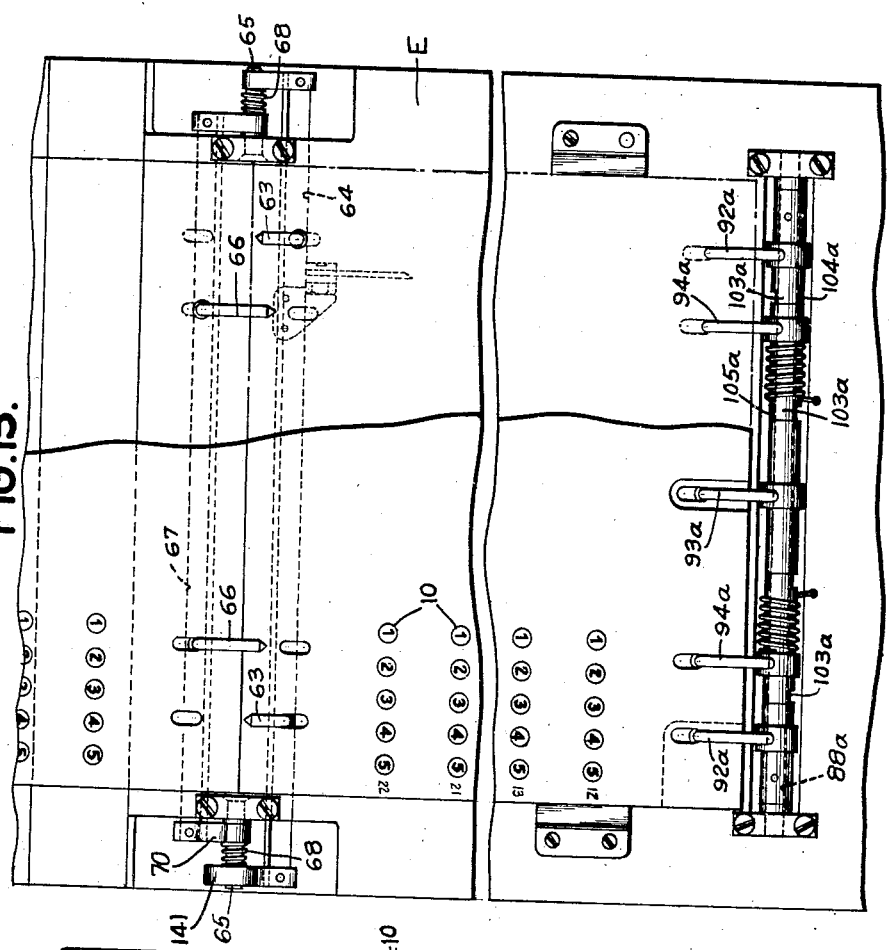
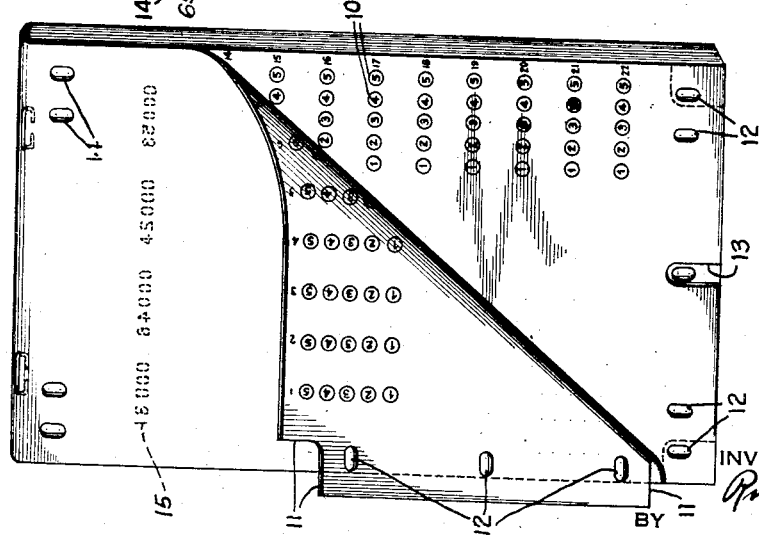
INVENTOR
Richard Warren
BY
W. M. Wilson
ATTORNEY Aug. 6, 1935.  R. WARREN  2,010,653
RECORD CONTROLLED STATISTICAL MACHINE
Filed July 12, 1933   13 Sheets-Sheet 11

INVENTOR
Richard Warren
BY
W. M. Wilson
ATTORNEY

Aug. 6, 1935.                R. WARREN                    2,010,653
                  RECORD CONTROLLED STATISTICAL MACHINE
                 Filed July 12, 1933          13 Sheets-Sheet 13

FIG.20.

INVENTOR
Richard Warren
BY
W. M. Wilson
ATTORNEY

Patented Aug. 6, 1935

2,010,653

UNITED STATES PATENT OFFICE 2,010,653

RECORD CONTROLLED STATISTICAL MACHINE

Richard Warren, New York, N. Y., assignor to International Business Machines Corporation, New York, N. Y., a corporation of New York Application July 12, 1933, Serial No. 679,995

13 Claims. (Cl. 235—92)

This invention relates to a counting apparatus and more particularly to a system for automatically measuring the performance of examinees in response to certain types of examinations. The cost of inspecting and scoring a large number of tests has made it necessary to devise a mechanical answer form for examinations that can rapidly be scored or graded by unskilled clerks. The type of examination which the present invention is best adapted to handle is of the type known as a "multiple choice test" in which each question consists of a statement followed by several possible phrases that could complete the statement; or each question may consist of several statements. In either case, only one of the phrases or one of the several statements is correct in each question and the examinee is required to select the phrase or statement that he believes is the correct one. The number of questions correctly determined in this manner is the examinee's score or grade on this "multiple choice" type of test.

The usual method of expediting the scoring of these tests employs a "key sheet" which is supplied to the scorer, and which is suitably arranged in accordance with the location of the answers specified on the examination paper. The "key sheet" consists of a column of numbers in the same spaced relationship as the answers in the original test form, and scoring consists in matching or comparing the column of responses with the column of correct numbers on the "key sheet". The scorer counts and records the number of questions that correspond between response and "key" and this number is the examinee's score.

The present invention is designed to mechanically score examinations in which the examination papers are arranged in book form and in which responses by the examinee are made on both sides of the several leaves of the examination book. Each leaf of the book is arranged with a plurality of rows of delimited areas, one row for each question, and in each of which a mark may be made by means of a pencil or similar instrument.

The "key book" is exactly similar and in the areas adjacent to the questions are made marks to represent the correct answers to the questions. The "key book" is arranged to be repeatedly analyzed in one section of the machine; once for each examination book to be scored. In this section the several pages of the "key book" are successively moved past an optical sensing device which successively scans the separate rows of areas corresponding to the separate questions. In another section of the machine the examination books are placed in a feed hopper from which they are fed one at a time to a feeding mechanism which causes each page thereof to pass a second optical sensing device in the same manner as the pages of the "key book" are passed beneath the first optical sensing device. The two books are analyzed in unison; that is, the rows of delimited areas of corresponding questions pass beneath the corresponding sensing devices simultaneously and a comparison is made between the two like questions as they are being sensed. If the result of the comparison shows that the answer to a question is correct, a circuit is established by the sensing devices to add "1" on a "right answer" counting mechanism and if the comparison shows that the answer is incorrect, "1" is added to a "wrong answer" counting mechanism. After all the pages of the two books have been compared, the number of right answers and the number of wrong answers will have been summarized and will then stand upon the adding wheels of the counting mechanism. The examination book is then brought into position adjacent the counting mechanism and an impression is automatically made from the counting wheels to record on the examination book the number of right and wrong answers as an indication of the examinee's rating. The counters are then restored in preparation for receiving entries under control of the next examination book which is to be compared with the "key book".

It is, therefore, the main object of the present invention to construct an automatic examination book scoring machine in which multi-leaved examination forms are automatically and successively fed to the machine and the several pages successively compared with corresponding pages of a "key book" and in which comparison is made to determine the number of right and wrong answers and this result is automatically printed upon the appropriate examination book. The automatic operation of the machine will obviously eliminate the human factor in this field of activity and such elimination will save the cost of labor, reduce the possibility of error, and enable the speedier and more accurate interpretation of the significance of the comparison between the examination book and the "key book".

A further object of the invention is to provide improved mechanism for separately tallying responses for separate groups of questions, as, for instance, in cases where it is desired to separately tally the responses to the odd numbered questions and to the even numbered questions. Educational researchers believe that if a given test is a fair measure of a student's ability, the student would make almost the same score if he took the test again. There is no way of proving this directly, however, since the student cannot be given the same test twice under identical conditions of information and attitude, but a given test can be divided into two parts and each part regarded as a separate test given at the same time. If the test is a good one, the student's score on each of the two parts should be about the same. This could be done by regarding, in a test of 154 questions, the questions from 1 to 77 as one test and from 78 to 154 as another test but it is considered better practice to make the two half tests overlap so that they are in effect given at the same time and for this reason the odd-even separation of the score is considered more desirable. This arrangement calls for the provision of two pairs of counters of which one pair will count wrong answers and right answers for the even numbered questions and the other pair will similarly count the odd numbered questions.

After the examination book has been completely analyzed, these results are automatically printed upon the examination book. It is possible that an examinee might mark more than one choice for a question. This could result from accident or oversight or it might be due to an examinee's belief that the machine only counted the number of right answers and that if he marked more than one, he would have a better chance of indicating the right one among the several choices and the machine might not take account of his duplicity but would credit him with a right answer. The machine will not do this but will instead record the double entry as a wrong answer.

It is necessary to provide a "wrong" counter as well as a "right" counter since in some kinds of tests, for example, the true-false, it is agreed that omissions of the question will not count against the examinee as much as a definitely wrong answer to the question. In order to obtain a count of the correct answers, the wrong answers, and the omissions, we must have the number of "rights" and the number of "wrongs", the difference between the total number of responses and total number of questions on the test giving, of course, the number of omissions.

Various other objects and advantages of the invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 2 is a right hand elevation of the machine.

Fig. 3 is a detail of one of the book retaining rings.

Fig. 4 is a section taken along lines 4—4 of Fig. 1.

Fig. 5 is a section through the examination book feeding mechanism. This section is taken substantially along the lines 5—5 of Fig. 1.

Fig. 6 is a detail of the examination book feeding fingers.

Fig. 7 is a section taken along lines 7—7 of Fig. 1, showing the main driving connections.

Fig. 7a is a detail of the "key book" securing device.

Fig. 8 is a sectional view through the counting and printing mechanism of the machine.

Fig. 8a is a further detail of a counter.

Fig. 9 is a further detail of parts shown in Fig. 8.

Fig. 10 is a sectional view taken along the lines 10—10 of Fig. 4, showing the operating mechanism for controlling the operation of the book holding fingers.

Fig. 11 is a detail showing the mechanism for placing an examination book upon the feeding drum.

Fig. 12 is a further detail of parts shown in Fig. 11.

Fig. 13 is a detail view showing the mechanism for turning the leaves of the book after it has been mounted upon the feeding drum.

Fig. 14 is a detail of a coupling, the section being taken substantially along the lines 14—14 of Fig. 4.

Fig. 14a is a detail circuit of one of the light sensitive cells.

Fig. 15 is a detail of the book retaining fingers, showing their relationship with respect to the feeding drum and a book.

Fig. 16 is a detail of an examination book.

Fig. 20 is a wiring diagram of the electric circuits of the machine.

*Examination book*

Figure 1:
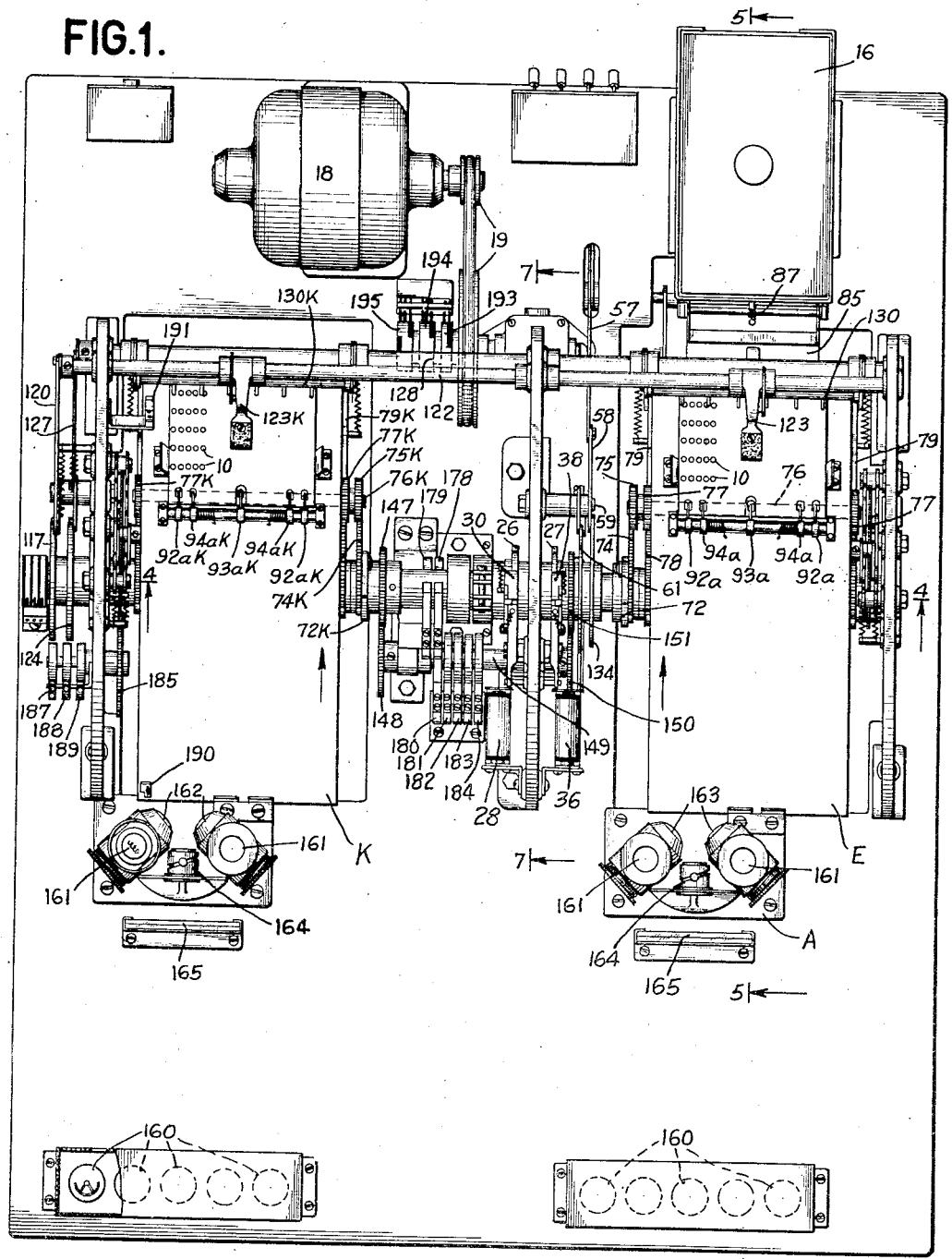
Fig. 1 is a plan view of the complete machine.

The examination book is shown in Fig. 16 and comprises a plurality of leaves stapled to form a book. In the present instance the book is made of four sheets, which, when folded over and stapled, constitute eight leaves and sixteen pages. On each page are five columns of circles 10 arranged in rows. There are eleven rows on each page and these rows are numbered consecutively. These columns of rows appear on each page except the first and last which are the cover pages. Adjacent to each row of circles may be printed five statements or completing phrases in accordance with the type of examination to be given and the student is requested to make a pencil mark in one of the five numbered circles in accordance with the statement he believes to be correct; for instance, a mark in the third position circle 10 of row twenty indicates that the third statement of the twentieth question is the examinee's selection as the answer to this question. Similarly, a mark in the fourth position circle for the twenty-first question would indicate this as the examinee's choice for such question. The circles 10 and the identifying numerals therein are preferably printed in a color which is non-responsive to the light sensing mechanism of the machine and the marks made by the student are preferably made with a lead pencil or similar instrument.

The ends of alternate leaves of the book have a different configuration; the first and succeeding odd numbered leaves have their corners cut out as at 11 and are provided with three holes 12. The second and succeeding even numbered leaves are provided with a notch 13 and four perforations 12, of which the inner two coincide in location with the outer two of the odd numbered leaves. This arrangement of notches and perforations is to facilitate the feeding and handling of the pages separately in a manner to be more fully explained hereinafter. Each page is also provided with four holes 14 near the upper end, which are also provided for feeding and handling purposes.

"Key book"

The "key book", as it is commonly called, is exactly similar in organization and configuration to the examination book just described, and prior to its insertion in the machine, marks are made in the circles 10 in positions corresponding to the correct answers for the several questions. It may be mentioned that with eleven questions on each page, the eight leaves will provide for 154 separate questions. The machine is not limited to handling books of a definite number of leaves but may receive books having fewer or more leaves than that shown in Fig. 16.

After the "key book" and the examination book have been completely analyzed and compared and the results of the comparison tallied on the counters, printing is automatically effected upon the last page of the examination book as on the line designated 15 in Fig. 16.

General description

A brief outline will first be given of the general operation of the machine, following which the separate mechanism will be explained in greater detail. Referring to Fig. 1, the machine comprises generally a "key book" feeding and analyzing mechanism, including substantially the mechanism shown on the left portion of the drawing, and an examination book feeding and analyzing section, which comprises the mechanism on the remainder of the drawing. The "key book" is carried by a drum K and the examination book is carried by a drum E. These two drums are rotated in synchronism and cause the questions to move past their respective light sensitive analyzing devices in succession. The "key book" remains indefinitely upon its drum K and is repeatedly analyzed, once for each examination book. The latter is fed from a supply hopper 16 and received by drum E, which, after the book has been completely analyzed, delivers it to a magazine 17 shown in Figs. 2 and 8.

Intermediate the drum E and magazine 17 is the counting mechanism, generally designated C, which tallies the results of the comparison between the "key book" and examination book. The examination books are momentarily interrupted in their passage from the drum to the magazine 17 and an impression made thereon from the counting mechanism.

Drums K and E are provided with what will hereinafter be termed "leafing mechanism", which automatically turns the pages of the two books in unison so that the corresponding pages will be presented to their respective analyzing devices in succession during successive rotations of the drums.

Main drive

The machine is driven from the motor 18 which has belt and pulley connection 19 (Figs. 1 and 7) with a shaft 20 which in turn, through gearing 21, drives a transverse shaft 22 to which is secured a worm 23 (see also Fig. 4). Worm 23 drives a worm wheel 24 loosely mounted upon drum shaft 25. The wheel 24 has integral therewith clutch driving elements 26 and 27, through the former of which the drums are coupled to the wheel 24 for rotation and through the latter, the examination book feeding and ejecting mechanisms are operated.

In Fig. 7 is shown a magnet 28, which, upon energization, will attract its armature 29 to release clutch lever 30 pivoted at 31 so that its spring 32 will rock it in a counterclockwise direction. One end of lever 30 normally engages a member 33 which is secured to shaft 25 (see Fig. 4) and which has pivoted thereto a spring-pressed clutching dog 34. Counterclockwise rocking of lever 30 will release member 33 and dog 34, whereupon the latter will rock into engagement with continuously running clutch member 26 and shaft 25 will rotate with the lever 26 and worm wheel 24. Since the drums K and E are secured upon shaft 25 they will rotate together.

The clutch mechanism just described is of the so-called one revolution type; that is, after a single revolution the devices will tend to restore to normal position. Member 33, during its rotation, is adapted to engage a depending arm 35 integral with lever 30 to rock it in a clockwise direction so that the lever will be in de-clutching position after the member 33 has completed a full revolution. If, however, the magnet 28 is re-energized before member 33 has completed a full revolution or if the magnet remains constantly energized, the member 33 and the mechanism associated therewith will continue rotating without interruption. The manner in which magnet 28 is maintained energized will be pointed out in detail in connection with the description of the circuit diagram.

In Fig. 5 is shown the clutching mechanism associated with the clutch driving element 27. This clutching mechanism is exactly similar to that just described and includes a magnet 36, armature 37, clutch lever 38 controlled thereby, a member 39 adapted to be normally held in vertical position by the lever 38, and a clutching dog 40 carried by the member 39. Energization of magnet 36 will, in a similar manner, permit dog 40 to rock into engagement with driving element 27 so that member 39 and the mechanism connected thereto will be rotated by the clutch element 27.

In Fig. 4, the member 39 is integral with a sleeve 41 which carries camming devices for controlling the operation of certain mechanisms of the machine, including the examination book feeding and positioning mechanism, and the ejecting mechanism. As will be pointed out hereinafter, the two clutch controlling magnets 28 and 36 will operate independently at times to cause independent operation of their associated devices and will at times operate together to cause concurrent operation of the controlled mechanisms.

Examination book feeding mechanism

The examination books are placed in the feed hopper 16 with the first page uppermost and with the holes 14 at the left, as viewed in Fig. 5. Picker fingers 42 are normally positioned beneath the hopper 16, as in Fig. 6. The fingers are pivoted at 43 to an extension of a cross bar 44, which is supported upon rods 45 mounted for horizontal reciprocation in fixed bearings 46. Each finger 42 has a depending bifurcated arm 47 which straddles a rod 48 carried by arm 49. The cross bar 44 carries a notched member 50 which also straddles rod 48, as shown. The member 50 is resilient at the point 51 so that it may be adjusted with respect to bar 44 by means of a set screw 52 threaded in a bracket 53 integral with the bar 44. The finger 42 is provided with a pin 54 and the operation is such that as arm 49 is rocked in a counterclockwise direction, rod 48 will first rock finger 42 about its pivot 43, causing pin 54 to rise into a hole 14 in the lowermost examination book. Continued movement of rod 48 toward the left will engage the left edge of the notched member 50 so that thereafter the member 50, together with bar 44 and the fingers 42 will be moved toward the left, from the position shown in Fig. 6 to that of Fig. 5, carrying therewith the lowermost examination book.

It will be apparent that upon the return stroke of arm 49, a similar action will take place; that is, rod 48 will first rock fingers 42 in a counterclockwise direction to lower the pin 54, after which rod 48 will engage the right side of the notched member 50 and the entire mechanism will be moved toward the right. By means of the set screw 52, the member 50 may be adjusted with respect to rod 48 so that the rod will engage member 50 sooner or later, depending upon whether the examination books to be fed have fewer or more leaves. Stating this in other words, if the examination book has a relatively small number of leaves, it is not desirable to move the pin 54 upwardly as great a distance as for a thicker book so that the adjustment of member 50 will permit horizontal movement of the fingers as soon as the pin has risen the desired distance. It will be apparent, however, that if books having different numbers of pages are to be fed, adjustment of fingers 42 for feeding the books of minimum thickness will also take care of feeding the thicker books.

The arm 49 is mounted upon a shaft 55 to which is also secured an arm 56 which is connected by a link 57 to an arm 58 pivoted at 59 to a fixed portion of the machine and having a roller 60 at the opposite end thereof. Roller 60 cooperates with a cam 61 which is carried by the sleeve 41 (see also Fig. 4).

Carried by shaft 55 is an arm 62 which, as the examination approaches the drum, is adapted to open a set of holding rings to receive the book. These rings are better shown in Figs. 3 and 19 and comprise a set of fingers 63 carried by a bar 64 pivoted on rods 65 and a set of fingers 66 carried by a bar 67 which is also pivoted about rods 65. Coil springs 68 are arranged to normally urge the fingers into position to retain the book. As the first book is advanced from the feed magazine the fingers 63 are in the position shown in Fig. 3 and as the arm 62 rocks in a counterclockwise direction, a spring-pressed arm 69 pivoted at the extremity of arm 62 will engage an extension 70 to rock bar 67 about rods 65 and will position fingers 66 as in Fig. 3. The continued counterclockwise rocking of arm 62 will cause arm 69 to snap past projection 70 so that fingers 66 may move in a counterclockwise direction into openings 14 at which time the parts will be in the position as shown in Fig. 5. Following this, the follower roller 60 will drop off the high portion of cam 61 and arms 49 and 62 will be moved rapidly toward the right under the influence of springs 71.

At this time a notched member 72 (Figs. 4 and 14) which is carried by sleeve 41 will engage a spring-pressed dog 73 carried by a sector 74 loosely mounted upon shaft 25. Sector 74 has gear connection with a pinion 75 mounted on a shaft 76 to which is also secured a pair of pinions 77 (Fig. 5). The shaft 76 is carried by drum E. Pinions 77 mesh with teeth 78 on a pair of members 79 which are freely pivoted about shaft 25. The cross connection between sector 74 and teeth 78 of the arm 79 is shown in Fig. 1 from which it will be apparent that movement of sector 74 under the action of notched member 72 will cause similar movement of the arms 79.

Referring now to Fig. 10, the shaft 76 extends through drum E and carries the second pinion 77 at the other extremity thereof which operates the second arm 79. The pair of arms 79 support arms 80 at their free ends between which is mounted a rod 81 provided with a number of fingers 82. When the drum E is in book receiving position, as in Fig. 10, the arms 79 are positioned as shown and springs 83 serve to rock arms 80 in a counterclockwise direction so that the rod 81 and fingers 82 are positioned in a recess 84 of the drum. If the arms 79 are rocked in a clockwise direction, the fingers 82 and rod 81 will ride out of recess 84 and onto the periphery of the drum, the springs 83 serving to hold the fingers 82 in contact therewith. Rod 81 will first engage a blade 85 (Fig. 11) pivoted at 86 and normally held in the position shown in Fig. 11 by a spring 87. Rocking of blade 85 under the influence of rod 81 will lower the blade against the advanced examination book, as shown in the dotted line position of Fig. 11, causing it to be further withdrawn from the hopper. After the rod 81 has moved sufficiently to release blade 85, the fingers 82 will roll the examination book around the periphery of the drum as the book is withdrawn from the hopper. It will, of course, be understood that the fingers 82 are not directly in line with the fingers 63 and 66 so that there is no interference between them.

As the arm 79 continues to move from the position of Fig. 11 to that of Fig. 12, a group of fingers carried by a rod 88 will be rocked from the position shown in Fig. 11 to that in Fig. 12 and will again be rocked back to the position of Fig. 11 when the book is completely wrapped around the drum E, as in Fig. 12, so that the fingers enter holes 12 in the end of the book. The arms 79 move slightly farther in a clockwise direction that is shown in Fig. 12.

The additional movement will cause pins 89 in arms 80 to engage in detenting notches 90 which are carried by arms rigidly secured to the base of the machine. The arms 79 remain in this position until subsequent clockwise rotation of drum E has brought the recess 84 adjacent to fingers 82 and rod 81 whereupon the latter will be drawn into the recess. At the same time pins 91 carried by the drum will engage the arms 79 (see Fig. 10) and continued rotation of the drum will carry along the arms 79 in the relative positions shown in Fig. 10.

*Finger operating mechanism*

Figure 19:
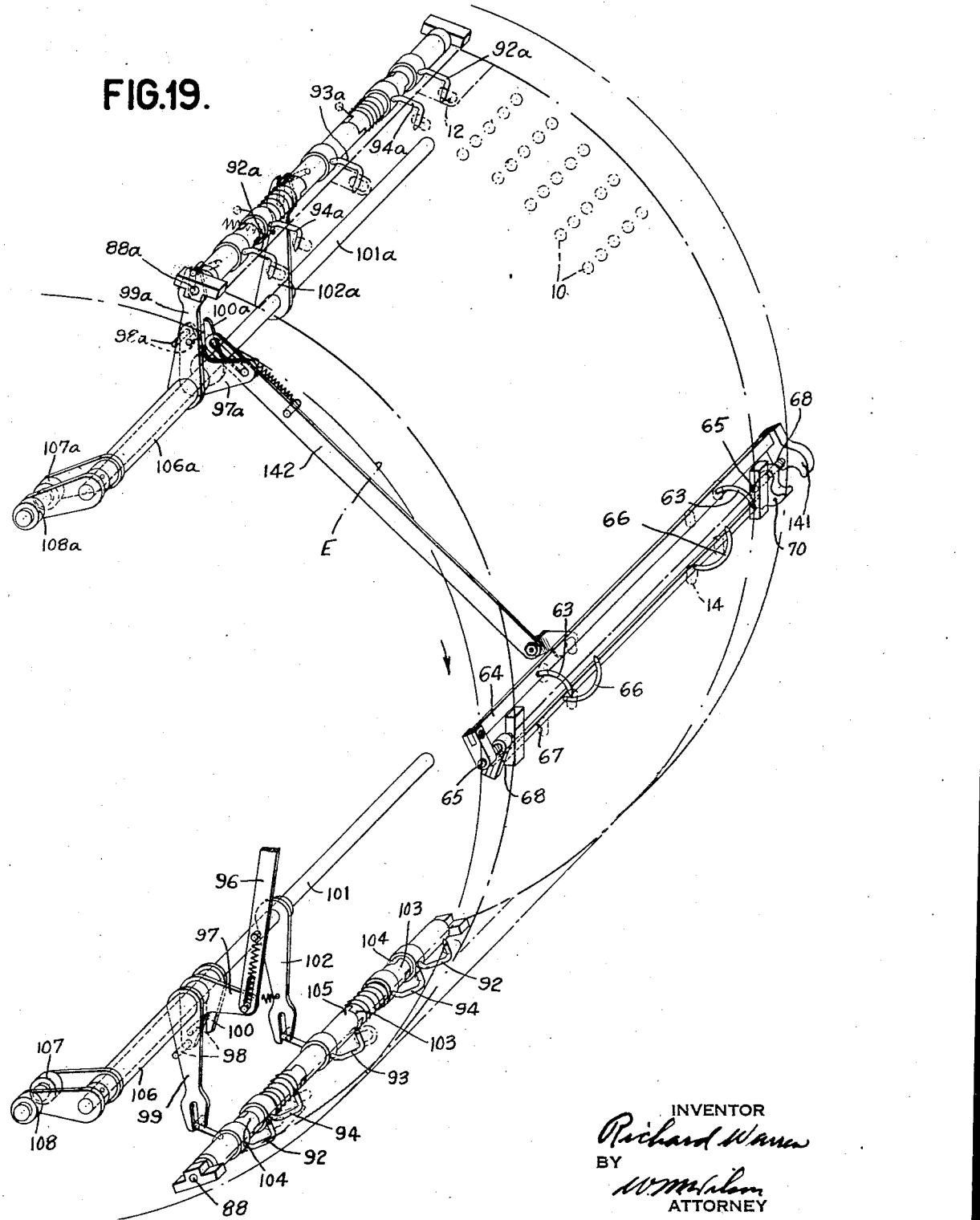
Fig. 19 is an isometric view showing the arrangement of the book holding fingers and the operating devices therefor.

The fingers carried by rod 88 are shown in Figs. 11 and 19 and include two fingers 92 which are secured to the rod, a central finger 93 loose upon the rod, and two intermediate fingers 94 which are also loose upon the rod. When the drum is in the position as in Fig. 11, all of the fingers 92, 93 and 94 are rocked under control of the following mechanism. The shaft 76 carries a disk from which extends a pin 95 which engages a notch in the upper end of a spring-pressed link 96 so as to raise the link from the position of Fig. 11 to that of Fig. 12 to open the fingers. When the pin has moved out of the notch in the link the latter will drop back into the position of Fig. 11. The lower end of the link has pin and slot connection to a bell crank 97 (see also Fig. 19) from opposite sides of which project a pair of pins 98, one of which lies under a forked arm 99 and the other lies under an arm 100 secured to a rod 101 to which rod is secured a second forked arm 102. The arms 99 and 102 are adapted to engage extensions of fingers 92 and 93, respectively, in such manner that counter-clockwise rotation of the arms, as viewed in Figs. 12 and 19, will rock the fingers 92 and 93 away from the drum. The fingers 94 are provided with lugs 103 which are adapted to be engaged by lugs 104 associated with fingers 92 and lugs 105 associated with finger 93 in such manner that rocking of either fingers 92 or 93 will also cause rocking of the fingers 94.

The arm 99 is integral with the sleeve 106 which carries a cam follower arm and roller 107 at its outer extremity and the shaft 101 carries a similar cam follower arm and roller 108 at its outer extremity through which the arms 99 and 102 may be separately and independently actuated during the operation of the machine to successively release the pages of the book for turning.

At this point in the operation of the machine the book is now held on the periphery of the drum in closed position between fingers 63 and the group of fingers 92—94 and the drum is in readiness to rotate the book past the analyzing devices which are generally indicated at A, Fig. 5.

During the first cycle the cover of the book will move past the analyzing devices and since the cover is not to be analyzed, this first cycle is not effective for operating the recording mechanism.

The followers 107 and 108 (see Fig. 10) are adapted to be operated by camming members 109 and 110, respectively, which are pivoted at 111 to the frame of the machine and spring-biased in a counterclockwise direction. The members 109 and 110 are adapted to be rocked into the paths of their respective follower rollers by cam rollers 112, 113 carried on opposite sides of a gear 114 which is pivoted at 115 to the frame of the machine and driven by a gear 116 secured upon the shaft 25 (see also Fig. 4). The ratio between gears 116 and 114 is 2:1 so that during one cycle of the drum the camming member 110 will operate its follower roller 107 to rock the fingers 92 and 94 and during the next cycle the camming member 109 will be rocked to cooperate with roller 108 for operation of fingers 93 and 94. It will thus be apparent that due to the configuration of the ends of the several leaves of the book that the leaves will be successively released during successive cycles of the drum.

With the book wrapped about the drum as explained, the outermost leaf will be that having the cut corners 11 as in Fig. 16 so that toward the end of the first rotation of drum E rocking of fingers 93 and 94 which cooperate with the central and two adjacent holes 12 will free the end of the first leaf and fingers 92 will remain in engagement with the two outermost holes 12 in the second sheet, preventing its release. During the next revolution, fingers 92 and 94 will be rocked to release the second sheet and the central finger 93 will continue to hold the third and following sheets. In this manner, the fingers 92 and 93 alternate in their operation to successively release the ends of the several sheets.

This release of the ends of the sheets occurs when the drum is substantially in the position shown in Fig. 13 and at this time the cam 117 carried by shaft 25 engages and rocks a bell crank follower arm 118 pivoted at 119 to a fixed portion of the machine and through a link 120 and arm 121 rocks a transverse shaft 122 (see also Figs. 1 and 4). Resiliently mounted upon shaft 122 is a rubber-ended leafing finger 123 which is moved into engagement with the sheet after it has been released by the fingers 92 or 93, as the case may be, and held in such engagement as the drum E continues rotating, thereby causing the sheet to buckle as indicated in Fig. 13. Just before the fingers 63, 66 reach the leafing finger 123, the latter is raised out of contact with the drum and the fingers 63 and 66 pass thereunder. The sheet will remain in contact with the leafing finger and be flipped or turned over upon itself as the drum continues to rotate. At this time a cam 124 also carried by the shaft 25 (see also Figs. 1 and 4) will actuate a bell crank follower arm 125 and through a link 126 and arm 127 rock a shaft 128 to which are secured arms 129 supporting a rod 130 and fingers 131 which, under control of the cam 124, move into engagement with the flipped-over sheet, after the fingers 63, 66 have passed by.

These fingers 131 serve to flatten the turned-over sheet against the drum and hold it until it has been secured thereto. The means for securing the turned-over sheet to the drum comprises a set of fingers exactly similar in arrangement to the fingers 92, 93 and 94 and they are correspondingly indicated at 92a, 93a, and 94a in Fig. 19. These fingers are controlled in an identical manner from rollers 108a and 107a through fingers 99a and 102a.

In Fig. 10, the rollers 108a and 107a are controlled by camming members 109a and 110a, respectively. These members are also operated by the cam rollers 112 and 113 in the same manner as cam members 109 and 110. Thus the fingers 92a, 93a and 94a are alternately operated to receive the end of the flipped over leaf; that is, when a leaf having its corners cut away at 11 is flipped over, the fingers 93a and 94a will rock away from the drum to receive the sheet and then again into engagement therewith to hold the leaf.

In Fig. 5, a pair of card lever contacts 132 are provided which close when the book is first secured to the drum and a pair of card lever contacts 133 which close after the first page has been turned over.

It has thus far been explained that after the book has first been secured to the drum the leaves are successively turned over during successive rotations of the drum and during each rotation the columns of marking positions move past the analyzing position A to be analyzed thereby. After the last page has been turned over, contacts 132 will open and in conjunction with other instrumentalities to be explained in more detail in connection with the circuit diagram, the clutch magnet 36 is energized and the cams controlled thereby will commence to rotate together with the drum. A cam 134 (Figs. 4 and 5) carried by the sleeve 41 and now rotating with the drum will cooperate with a follower roller 135 on an arm 136 and through a link 137 will rock a rod 138 in a counterclockwise direction against the tension of its spring 139.

This action takes place just prior to the arrival of the drum E in the position shown in Fig. 8. At this time, of course, it will be recalled that all of the leaves have been turned over and the entire book is supported between the fingers 63, 66 and the fingers 92a, 93a and 94a. Rod 138 has secured thereto a camming member 140 (see also Fig. 9) which is adapted to engage an extension 141 of bar 64 to open fingers 63. At the same time, a link 142 pivoted to a further extension of bar 64 is drawn toward the left (as viewed in Figs. 8 and 9) and, by virtue of the pin and slot connection to bell crank 97a, will cause rocking of all the fingers 92a to 94a. This concurrent operation of fingers 63 and the fingers 92a to 94a will completely release the examination book which will thereupon fall away from the drum E upon a tray 143 down which it will slide until interrupted by a stop plate 144. Suitable leaf springs 145 are also carried by shaft 138 to insure the removal of the book from the drum after it has been released by the fingers. With the book in position against the stop 144, the printing mechanism is actuated in a manner to be more fully explained hereinafter and an impression is made thereon from the printing wheels. Following this, the solenoid 146 is energized to retract plate 144 and the examination book will continue its descent into the receiving magazine 17.

*"Key book" feeding mechanism*

As pointed out above, the drums K and E are both secured to the shaft 25 and accordingly rotate in unison. The drum K is equipped with fingers for holding the notched ends of the several leaves in the same manner as the leaves on the drum E are held. Similar mechanism is provided for so holding the leaves and parts on the drum K which perform similar functions to corresponding parts on the drum E have been designated with the same reference characters followed by the letter K.

Figure 17:
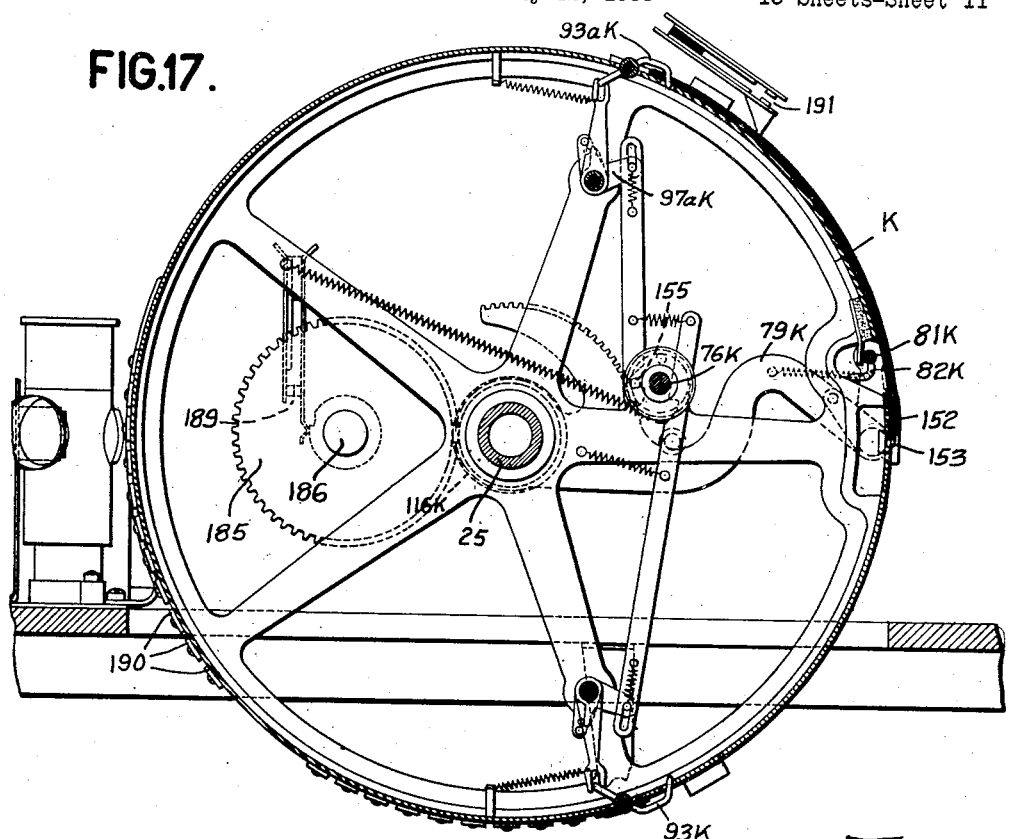
Fig. 17 is a sectional view taken along the lines 17—17 of Fig. 4, showing the drum for feeding the "key book".

Specifically, in Fig. 17, which is a central section of the drum K, fingers 93K perform the same functions as the fingers 93 on the drum E of Fig. 5 and the fingers 93aK perform like functions to the fingers 93a of Fig. 5. The drum K is also provided with a pair of arms 79K, a rod 81K and fingers 82K for wrapping the book around the drum. Inasmuch as the operation of these parts is the same as the operation of corresponding parts of drum E, no further detailed explanation thereof need be made.

The operation of the arms 79K is controlled through a sector 74K and notched member 72K. Member 72K is integral with a gear 147 which meshes with a gear 148 on a shaft 149 (see also Figs. 1 and 7). The shaft 149 has a gear 150 at its opposite end which meshes with a gear 151 secured to the sleeve 41. By virtue of this gear connection, the arm 79K will operate together with arm 79, both being controlled from the sleeve 41.

The "key book" is secured to the drum K in the manner indicated in Fig. 7a by inserting half the leaves between a bar 152 and the drum and drawing the leaves through until the center of the book is in line with the inner edge of the bar. This bar is freely pivoted on studs 153 secured to the drum and after the book has been placed on the bar it is folded against the periphery of the drum as shown in Fig. 17; the fingers 92aK to 94aK are manually opened and then closed through the holes 12 in the book. The "key book" will therefore be on the drum in the position shown in Fig. 17 at the time arm 79 of the drum E withdraws the examination book from the hopper and secures it to the drum E. The concurrent operation of the rod 81K in Fig. 17 will at the same time engage the inner leaf of the "key book", causing the book to swing about the pivot 153 together with the bar 152 and assume a position on the periphery of the drum between pivot 153 and finger 93K. Before the "key book" is moved to this position, however, it is necessary to release the upper end thereof by operation of the fingers 92aK, 93aK and 94aK. This is effected by a pin 155 carried in a disk on the shaft 76K which will draw downwardly on bell crank 97aK to open the fingers in the now familiar manner. From this point on, the corresponding pages of the two books will move past the optical systems in unison and the leaves will be turned over together through their related leafing fingers 123 and 123K. After the "key book" has been completely analyzed, it will again be in the position shown in Fig. 17 and the drum will come to rest in this position and remain so while a new examination book is being fed to the drum E after which the cycle of operations is repeated and the "key book" is again completely analyzed.

*Optical system*

Figure 18:
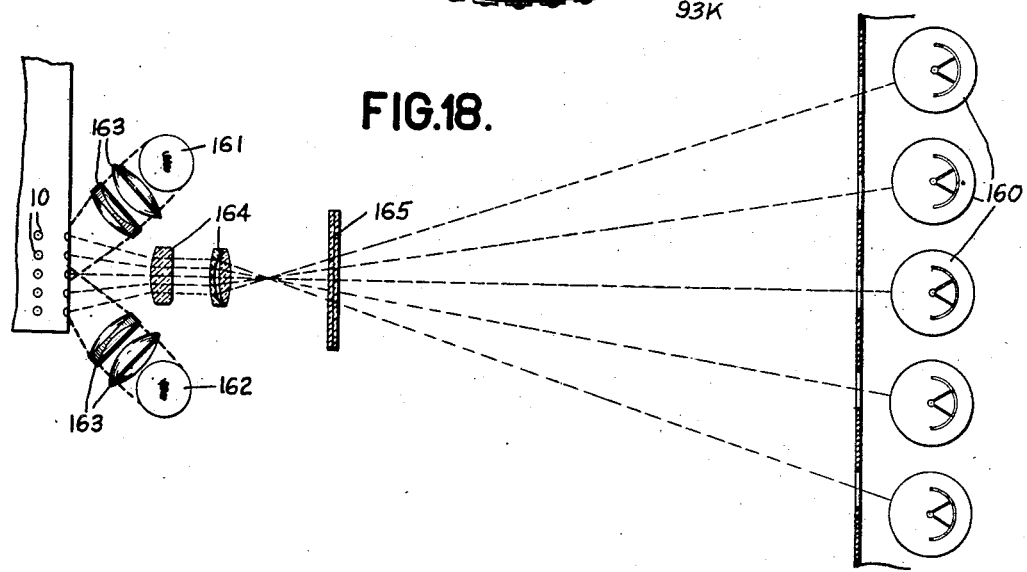
Fig. 18 is a diagrammatic showing of the relationship between the record and the optical sensing devices.

One of the light sensitive analyzing devices is shown diagrammatically in Fig. 18 and since the two are identical in their organization an explanation of one will be sufficient. Five photo-electric cells 160 are provided, one for each of the five columns of areas to be read. A pair of projection lamps 161 and 162 are provided with suitable lenses, generally indicated at 163, which project a horizontal beam of light upon the book. This beam covers substantially the area embracing the five circles of a row of marking positions. Light is reflected from the book or the surface of the drum through a system of lenses generally indicated at 164, thence through a light filter 165 to the photo-electric cells 160. The filter 165 serves to prevent the actuation of the photo-electric cells by the printing on the pages of the book. The detailed manner in which a mark made in a circle 10 affects a photo-electric cell will be explained in further detail in connection with the circuit diagram.

*Counting mechanism*

The counting mechanism is of well-known form and only so much thereof is illustrated as is necessary for an understanding of the present invention. For more detailed explanation of its operation, reference may be had to U. S. Patent No. 1,880,427, granted to E. A. Ford, October 4, 1932. In general, each counter, of which four are provided, comprises a plurality of printing wheels 166 (Figs. 8 and 8a) which are frictionally driven in a clockwise direction by a shaft 167 which has gear connection 168 to the armature shaft of motor 169. Energization of a magnet 170 during the clockwise rotation of shaft 167 will cause one to be added on the units order wheels 166 of its associated counter. Suitable transfer mechanism may be utilized as shown in the patent referred to, between the several denominational orders. For resetting the counters, the current to the motor 169 is reversed as will be explained in connection with the circuit diagram and the consequent counterclockwise rotation of shaft 167 will zeroize the several counters.

Suitable ribbon feeding mechanism (not shown), for feeding an inking ribbon 171 may be provided and inserted between the printing wheels and the printing hammer 172, which is carried by arms 173 pivoted at 174. In Fig. 2, rod 174 carries an arm 175 connected to the plunger of solenoid 176 so that energization of the solenoid will draw the hammer 172 downwardly against the printing wheels to take an impression therefrom.

Associated with the armature of each of the counter magnets 170 is a pair of contacts 177 which open at the end of the stroke of the magnet armature.

Miscellaneous contact devices

In Figs. 1 and 7 are shown two pairs of contacts 178 and 179 which are controlled in their operation by suitable cams on the drive shaft 25. Adjacent to shaft 149 are a plurality of pairs of contacts 180 to 184 which are operated from suitable cams on this shaft, which, it will be recalled, rotates when the sleeve 41 is in operation. In Fig. 17 the gear 110K also drives a gear 185 mounted upon a rod 186 which also carries a number of cams for operating pairs of contacts 187, 188 and 189 (see Fig. 1). The drum K (Figs. 1 and 17) is also provided with a multiplicity of lugs 190 secured near the outer edge of the drum. These lugs are adapted to successively contact and close a pair of contacts 191 located as shown and their spacing corresponds to the distance between successive questions on the pages of the "key book". Their function is to cause contacts 191 to close while the corresponding questions are analyzed.

In Fig. 5 a pair of hopper contacts 192 is provided which remain closed as long as there are books in the hopper and open after the last book has been fed therefrom. Mounted on the shaft 20 (Figs. 1 and 7) are commutators 193, 194 and 195 which operate continuously as long as the motor 18 is in operation. The manner in which these various contacts control the operation of the machine will be more fully set forth hereinafter.

Circuit diagram

The electric circuits of the machine will now be explained in detail and a general description of the operation of the machine will be made together therewith, pointing out the sequence in which the various operations take place.

The electric circuits of the machine are shown on Fig. 20 and current is supplied to the machine from a suitable source through a switch 200 to the negative side of line 201 and positive side of line 202. In the following description the cycles of operation involved in feeding and leafing the books will first be explained, following which the circuits involved in analyzing and comparing the indications on the two books will be set forth.

After examination books have been placed in the hopper 16, and the "key book" secured to drum K, the operator will depress the start key to close contacts 203 which complete a circuit through a relay magnet 204 which will attract its armature to close contacts 204a and 204b. The contacts 204b complete a circuit to a relay 205 which closes its points 205a to in turn energize the driving motor 18. The closure of the main switch 200 had previously caused the completion of a circuit from line 202, wire 208, contact points 209a of the relay 209, contacts 210a of relay 210, both normally in closed position, relay magnet 211, wire 212 to negative side of line 201.

The contacts 204a of magnet 204 set up a holding circuit for the magnet 204 which is traceable as follows: from line 201, magnet 204, contacts 204a, stop key contacts 206, wire 207, contacts 211a, closed by relay magnet 211 which is energized at this time as just explained, wire 213, hopper contacts 192, closed due to the presence of books in the hopper 16, back to positive side of line 202. This circuit will maintain the motor 18 in operation as long as relay magnet 211 remains energized. The energization of relay magnet 211 will through closure of its contact points 211b complete a circuit from line 201, magnet 35, wire 214, contacts 211b, contacts 189, now closed, contacts 180 also closed at this time, to line 202. The magnet 36 upon energization, will cause operation of the mechanism for advancing an examination book from the bottom of the hopper into engagement with the drum E whereupon the rings 63, 66 on the drum will receive the book and the rod 81 and fingers 82 will wrap it around the drum to be secured by fingers 92, 93 and 94.

At this time, the book is in the position shown in Fig. 12 and the card lever contacts 132 are closed to set up a circuit from line 202, contacts 132, relay magnet 210, wire 215 to the other side of line 201. Magnet 210 will shift its armature to open the contacts 210a, permitting deenergization of relay magnet 211 and energization of a relay magnet 216, through a circuit traceable from line 202, wire 208, contacts 209a, contacts 210b, magnet 216, wire 212 to the opposite side of line 201. Magnet 216 will close its contacts 216a and 216b, the latter of which will maintain the holding circuit for the motor 18 as follows: line 201, magnet 204, contacts 204a, contacts 206, wire 207, contacts 216b, wire 217, to line 202. The magnet 211 is provided with additional contacts 211d which furnish an additional path, branching from the wire 207, through the contacts 211d to wire 217 and thence to line 202. This latter circuit will remain in effect after the subsequent deenergization of magnet 216 which permits opening of the holding circuit through contacts 216b. Closure of contacts 216a will complete a circuit to magnet 28 traceable from line 201, magnet 28, wire 218, contacts 216a, wire 217, to line 202. Magnet 28 will cause driving connection to be made to the drums K and E and they will commence to rotate with their books in closed position.

Since during the first revolution of drum E the cover pages of the books are presented to their respective analyzing devices and since the cover pages bear no marking positions, no operation of the counters will take place during this cycle. Near the end of the cycle the leafing mechanism will come into operation to turn the first pages of the two books in the manner explained in connection with Fig. 13 and the turned page of the examination book will contact with and cause closure of card lever contacts 133 which will now be closed together with the previously closed contacts 132. A circuit is therefore traceable from line 202, wire 208, contacts 133, magnet 209, wire 215, to line 201.

Energization of magnet 209 will open its contacts 209a to cause deenergization of the magnet 216 and will cause closure of its contacts 209b to complete a circuit from line 202, wire 208, contacts 209b, contacts 210d, since magnet 210 is also energized at this time, relay magnet 219, wire 212, to line 201. Contacts 219b will provide an auxiliary holding circuit for the motor controlling devices in the same manner that contacts 216 did previously. Contacts 219a continue to hold the circuit to magnet 28, traceable from line 201, magnet 28, wire 218, contacts 219a, wire 217, to line 201. The magnet 28 is thus re-energized for the continued and uninterrupted rotation of the drums.

From this point on, a series of cycles of operations of the drums will take place and during each cycle a comparison will be made between corresponding answers and questions of the "key" and examination books, and at the end of each cycle, the analyzed pages will be turned or flipped over. After the last page has been analyzed and flipped over, the contacts 132 will, of course, open, permitting deenergization of relay 210 so that its contacts 210d open and 210c close. Magnet 219 is thereby deenergized and a relay magnet 220 is energized to complete the following circuit: from line 202, wire 208, contacts 209b, contacts 210d, magnet 220, wire 212, to line 201. Contacts 220b of the magnet 220 provide an auxiliary holding circuit for the motor in the same manner as contacts 216b and 219b. Closure of contacts 220a completes a circuit from line 201, magnet 28, wire 218, contacts 220a, wire 217, to line 202. This circuit will provide for an additional rotation of the drum with the book in position between the rings 63, 65 and the fingers 92a to 94a and the second cover of the book will move past the light sensing devices without, however, affecting their operation since it contains no marking positions.
Since at the end of the cycle the book is still in position on the drum, with contacts 133 closed, a further cycle of the drums will take place.

During this last cycle, however, the cam contacts 187 close and complete a circuit from line 202, contacts 187, contacts 220c, wire 214, magnet 36 to line 201. The magnet 36 will initiate the operation of the ejecting mechanism which will remove the examination book from the drum E and permit it to drop into position for receiving an impression from the counter wheels. This removal of the book from the drum will permit the opening of contacts 133 and cause deenergization of magnet 220 and the consequent deenergization of magnet 28 so that the drum will come to rest at the completion of this cycle. Incidentally, the opening of both pairs of contacts 132 and 133 will cause deenergization of both the relay magnets 209 and 210 and magnet 211 will again become energized through the circuit traced above.

After the drum has come to rest, the continued operations under control of magnet 36 will advance a new book from the hopper and secure it in position on the drum E. At the same time the "key book" is flipped over into its new starting position. After the new book has been placed on the drum E, the cam contacts 184 close to cause reenergization of the clutch magnet 28 and a new series of cycles of operation takes place in the same manner as just explained.

From the foregoing description it will be apparent that the coordination of the various cycles of operation are controlled by the card lever contacts 132 and 133 which, through the relays 209 and 210, control the operation of the relay magnets 211, 216, 220 and 219 in such manner that when there is no book upon the drum, the magnet 211 is energized; when a hook is first placed upon the drum in its initial position with no pages turned, magnet 216 is energized; after the first page has been turned and the book is in position for analysis by the light sensing devices, the magnet 219 is energized;
and after the book has been completely analyzed and the last page turned over, the magnet 220 is energized.

After the book has been ejected, the magnet 211 is again energized to start a new series of operations. It will also be apparent from the above description that the number of analyzing cycles of the machine is directly determined by the number of pages in the book to be analyzed; that is, a book having eight leaves will require seven analyzing cycles; whereas a book having four leaves will require three analyzing cycles. In either case, the number of cycles is entirely controlled by the operation of the contacts 132 and 133.

*Analyzing and comparing circuits*

The light sensing cells are indicated at 160 in Fig. 20. Those to the left are adapted to analyze the marking positions in the "key book" and those to the right analyze the marking positions in the examination book. Each light cell is associated with an amplifying unit, indicated generally at 221, which are connected in multiple and operated from a suitable source of energy, as indicated generally at AC. The specific manner in which each of the cells is associated with its related amplifier is generally indicated in Fig. 14a where the connections between a cell 160 and the first stage of its related amplifier are shown in detail, together with the operating batteries which are common to all of the cells and amplifiers.

As the rows of marking positions pass the analyzing positions, light is successively reflected from each of the rows of five circles 10 to the corresponding cells 160. The occurrence of a pencil mark in any circle will modify the light reflected upon the cell and the current controlled by the cell will be modified and controlled through its corresponding amplifier to energize coil 223 of a double wound relay. A coil 223 is provided for each of the five "key book" cells 160 and for each coil 223 is a holding coil 222. Briefly then, the occurrence of a mark in any position of a row of five circles 10 in the "key book" will cause energization of an associated coil 223.

The coils of the relays associated with the "key book" are designated at 223 and the corresponding coils of the relays associated with the examination book are indicated at 224 and the associated holding coils at 225. Energization of any coil 223 will cause closure of its contacts 223a, 223b, 223d and opening of 223c and 223e, while energization of a coil 224 will cause closure of relay contacts 224a and 224b. Contacts 223a provide a holding circuit traceable from line 201, wire 226, coil 222, contacts 223a, wire 227, contacts 191, which are repeatedly closed during the analysis of the rows of marking positions, contacts 178, which are continuously closed during the same period, to line 202. A similar circuit is traceable through the contacts 224a to energize the coil 225. These circuits are held between rows of marking positions and broken before the next succeeding row is analyzed for the purpose of holding the related contacts shifted for such duration of time.

The manner in which the relays effect a comparison between corresponding positions in the two books may best be explained by tracing the several possible conditions which may prevail. Assuming that a mark is made in a particular circle in the "key book" and that there is also a mark in the same position in the examination book, upon the concurrent analysis of these two positions, the related cells 160 will be effected and their associated coils 223 and 224 will both be energized at the same time, shifting their associated contacts as explained.

Assuming the uppermost cell 160 of both the "key book" and examination book to have been operated, a circuit is now traceable from line 202, contacts 178, brushes 193a on commutator 193 which serves to repeatedly bridge the brushes 193a once for each marking position, thence through wire 229 to the contacts 223c associated with the positions other than the uppermost, wire 230, contacts 223b in the uppermost position, wire 231, contacts 224b in the uppermost position, wire 232, contacts 223d, wire 233, switch 234, wire 235, relay magnet 236, wire 237, to line 201.

A portion of this circuit has been shown in heavy lines to facilitate the tracing thereof. Magnet 236 will close its points 236b to complete a circuit to the counter magnet 170RE from line 201, wire 237, magnet 170RE, contacts 236b, wire 238, contacts 239a of relay magnet 239, wire 240, wire 241, relay contacts 219c to line 202. The contacts 219c are controlled by the relay magnet 219 which, as explained above, is energized only when the book is in open position ready for analysis. Contacts 236a of the relay provide a holding circuit therefor which is traceable from line 201, wire 237, magnet 236, contacts 236a, contacts 177, contacts 239b, wires 240 and 241, contacts 219c to line 202. Energization of the magnet 170RE will cause opening of the contacts 177 and breaking of the holding circuit immediately upon operation of the magnet 170RE. The magnet 170RE controls the operation of the counter which adds the number of correct responses; that is, it will add the number of positions in which there is correspondence between the two similar positions analyzed.

If there are no marks made in a row of positions corresponding to a question, all of the contacts 224b will be open and no counting circuit will be completed.

If a contact 224b is closed in a position other than that corresponding to the contacts 223b and 223d, closed in response to a mark in one of the positions on the "key book" a circuit may be traced where, for instance, the uppermost magnet 223 is energized and the lowermost magnet 224 is energized. In this case, a circuit is traceable from line 202 as before, to wire 229, thence through the heavy line circuit traceable through the second pair of contacts 223c, wire 230, uppermost contacts 223b, wire 231 and from there, through the lowermost contacts 224b, lowermost wire 232, lower contacts 223e, wire 242, switch 243, wire 244, magnet 239, wire 237 to line 201. Magnet 239 will close its points 239a to complete a circuit through the counter magnet 170WE as follows: from line 201, wire 237, magnet 170WE, contacts 239a, wire 240 to line 202.

Contacts 239c set up a holding circuit through contacts 177 associated with the magnet 170WE which in turn break this holding circuit in the same manner as explained in connection with magnet 170RE. The magnet 170WE will thus serve to tally the number of responses which do not correspond with the correct answers in the "key book".

It is to be noted that the circuit through the magnet 170RE is traced through the contact points 239a of the relay magnet 239 associated with the magnet 170WE so that if the magnet 239 is energized due to a wrong answer, the magnet 170RE cannot be energized for that question. This arrangement provides for the condition where two positions in a row may be marked by the examinee and one of these positions represents a correct answer. In such case, both relay magnets 236 and 239 will be energized in accordance with the previously traced circuits. However, only the circuit through magnet 170WE will be ultimately completed since contacts 239a are open and this double response will be scored as a wrong answer by permitting energization of magnet 170WE only.

If switches 243 and 234 are shifted to their dotted line positions, the commutators 194 and 195 will be brought into operation to cause the odd numbered questions to be tallied separately from the even numbered questions. Specifically, during the analysis of even numbered questions, wires 233 and 242 are connected to wires 235 and 244 respectively through connecting segments on the commutators to control magnets 170RE and 170WE as explained. During the analysis of odd numbered questions, wires 233 and 242 are connected to wires 235a and 244a through other segments on the commutators. These wires lead to and control the operation of counter magnets 170RO and 170WO in the same manner that wires 235 and 244 control the magnets 170RE and 170WE so that a detailed tracing of the circuits will not be necessary.

After the examination book has been ejected from the drum and has arrived in position against the stop member 144 (Fig. 8), printing magnet 176 is energized under control of cam contacts 182, and following this cam contacts 183 close to energize solenoid 146 which will retract the stop 144 and permit the book to enter the hopper 17.

The counter drive motor is shown at 169 and during the operation of the machine receives current from line 201, through wire 246, contacts 247a of a relay magnet 247, motor 169, contacts 247c, field winding and wire 248 to line 202. After printing has taken place, cam contacts 181 close energizing magnet 247, shifting contacts 247a, 247b, 247c, and 247d whereby the circuit through the motor 169 is reversed and resetting of the counters thereby effected. The reversed circuit is traceable from line 201, wire 246, contacts 247b, motor 169, contacts 247d, field winding and wire 248 to line 202.

The lights 161, 162 are connected directly across the lines 201 and 202 and include in circuit a resistance 250 which causes the lights to burn at a low brilliance when the main line switch 200 is closed. During the period of operation when the marks are being analyzed, cam contacts 179 are closed and cause energization of relay magnet 251 which closes its contacts 251a. The contacts 251a shunt out resistance 250 and lights 161, 162 consequently receive more current and glow more brightly.

While there has been shown and described and pointed out the fundamental novel features of the invention as applied to a single modification, it will be understood that various omissions and substitution and changes in the form and details of the device illustrated and in its operation may be made by those skilled in the art without departing from the spirit of the invention. It is the intention therefore to be limited only as indicated by the scope of the following claims.

What is claimed is as follows:

1. In a machine of the class described, means for analyzing predetermined areas of a record for graphical marks therein, each mark having one of a number of significances, means including a second record for determining the significance of each mark analyzed, means controlled by said analyzing means for separately counting the marks having the same significance and means for recording the results on the first named record itself.

2. In a record controlled machine, a record having data designations on both faces thereof, an analyzing device, means for presenting the two faces of the record to said device in succession, and an entry receiving device controlled by said device in accordance with the designations analyzed.

3. In a record controlled machine, a record having data designating positions on both faces thereof, an analyzing device, means for moving all the said positions past said device in succession for analysis, and a counter controlled by said analyzing device in accordance with the data contained in the designating positions.

4. In a machine of the class described, a multi-leaved book having marking positions on the several pages thereof, an analyzing device, means for successively presenting all the pages of the book to said device, and an entry receiving device controlled by the analyzing device.

5. In a machine of the class described, a book having marking positions on the several pages thereof, analyzing means for analyzing the marking positions of the pages in succession, counting means controlled by said analyzing means to count the number of marks analyzed, and means controlled by said counting means for printing the total number of marks, upon one of the pages of the book.

6. In a machine controlled by records, an analyzing device, means for feeding a book to said device for analysis thereby, means controlled by the book for initiating the operation of said device and for causing the successive presentation of the several pages thereto, counting means controlled by the analyzing device, and further means controlled by the book for causing interruption of the operation of the analyzing device after the last page has been analyzed.

7. In a machine of the class described, a supply hopper, a carrier, means for feeding a book from said hopper to said carrier, means for securing the book to said carrier, analyzing means and a counter controlled thereby, means for moving said carrier to cause said book to repeatedly pass said analyzing means, means for turning the leaves of the book to present the several pages thereof to the analyzing means in succession and means controlled by the hook after the last page has been turned for causing the removal of the book from the carrier.

8. The invention set forth in claim 7 in which printing means is brought into operation under control of the book to print thereon under control of the counter.

9. In a machine of the class described, analyzing means, means for concurrently feeding a pair of books past said analyzing means for concurrent analysis, means for concurrently turning the leaves of the books to permit analysis of all the pages thereof and a counter controlled by said analyzing means in accordance with the result of the concurrent analysis of the pages of the books.

10. In a machine of the class described, a record book bearing graphical indicia on the pages thereof, light sensitive analyzing means, means for successively presenting the pages of the book to the analyzing means for analysis of the indicia on the pages, a plurality of counters adapted to be controlled by said analyzing means and means cooperating with said analyzing means for selectively associating one of said counters with said analyzing means for control thereby.

11. In a machine of the class described, means for analyzing a record bearing graphical marks arranged in columns, a pair of counters controlled by said analyzing means for counting marks in said columns, a second analyzing means for analyzing a second record bearing graphical marks arranged in columns, and means controlled by said second analyzing means for selectively associating either of said counters with said first named analyzing means for control thereby.

12. In a machine of the class described, means for analyzing marks made on a record representing responses to questions, means for analyzing marks made on a second record representing correct answers to the questions, comparing means controlled by both said analyzing means, a pair of counters controlled in accordance with the comparison to tally the number of correct and incorrect responses on the first named record, and means for printing the results upon the first record.

13. In a machine of the class described, means for repeatedly analyzing the pages of a key book in succession, means for concurrently analyzing the pages of an examination book the number of whose pages may be equal to or less than the number of pages of the key book, a counter jointly controlled by said analyzing means, and means controlled by the examination book for interrupting the analysis of the key book after the last page of the examination book has been analyzed.

RICHARD WARREN.